(12) United States Patent
Shrivastava et al.

(10) Patent No.: US 12,008,787 B2
(45) Date of Patent: Jun. 11, 2024

(54) OBJECT POSE ESTIMATION

(71) Applicant: Ford Global Technologies, LLC, Dearborn, MI (US)

(72) Inventors: Shubham Shrivastava, Sunnyvale, CA (US); Gaurav Pandey, College Station, TX (US); Punarjay Chakravarty, Campbell, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 374 days.

(21) Appl. No.: 17/380,174

(22) Filed: Jul. 20, 2021

(65) Prior Publication Data
US 2023/0025152 A1 Jan. 26, 2023

(51) Int. Cl.
*G06T 7/73* (2017.01)
*B60W 10/04* (2006.01)
*B60W 10/18* (2012.01)
*B60W 10/20* (2006.01)
*G05B 13/02* (2006.01)
*G06N 3/084* (2023.01)

(52) U.S. Cl.
CPC ............... *G06T 7/74* (2017.01); *B60W 10/04* (2013.01); *B60W 10/18* (2013.01); *B60W 10/20* (2013.01); *G05B 13/027* (2013.01); *G06N 3/084* (2013.01); *G06T 7/75* (2017.01); *G06T 2207/10024* (2013.01); *G06T 2207/10028* (2013.01); *G06T 2207/20084* (2013.01); *G06T 2207/30204* (2013.01); *G06T 2207/30232* (2013.01)

(58) Field of Classification Search
CPC ... G06T 7/74; G06T 7/75; G06T 2207/10024; G06T 2207/10028; G06T 2207/20084; G06T 2207/30204; G06T 2207/30232; G06T 2207/20081; G06T 2207/30236; B60W 10/04; B60W 10/18; B60W 10/20; G05B 13/027; G06N 3/084; G06N 3/0464; G06N 3/0895
See application file for complete search history.

(56) References Cited

U.S. PATENT DOCUMENTS

| | | | |
|---|---|---|---|
| 10,373,369 B2 | 8/2019 | Rad et al. | |
| 10,474,908 B2 | 11/2019 | Levi et al. | |
| 10,937,189 B2 | 3/2021 | Li et al. | |
| 2006/0250353 A1* | 11/2006 | Yasutake | G06F 3/0383 345/156 |

(Continued)

*Primary Examiner* — Donald J Wallace
*Assistant Examiner* — Jalal C Coduroglu
(74) *Attorney, Agent, or Firm* — Frank A. MacKenzie; Bejin Bieneman PLC

(57) ABSTRACT

A depth image of an object can be input to a deep neural network to determine a first four degree-of-freedom pose of the object. The first four degree-of-freedom pose and a three-dimensional model of the object can be input to a silhouette rendering program to determine a first two-dimensional silhouette of the object. A second two-dimensional silhouette of the object can be determined based on thresholding the depth image. A loss function can be determined based on comparing the first two-dimensional silhouette of the object to the second two-dimensional silhouette of the object. Deep neural network parameters can be optimized based on the loss function and the deep neural network can be output.

20 Claims, 8 Drawing Sheets

(56) References Cited

U.S. PATENT DOCUMENTS

| | | | |
|---|---|---|---|
| 2016/0084960 A1* | 3/2016 | Harrison | G01C 3/00 |
| | | | 356/4.03 |
| 2019/0147221 A1* | 5/2019 | Grabner | G06T 7/75 |
| | | | 382/103 |
| 2019/0333199 A1* | 10/2019 | Ozcan | G06T 3/4046 |
| 2020/0041276 A1* | 2/2020 | Chakravarty | G01C 21/3848 |
| 2020/0394848 A1* | 12/2020 | Choudhary | G06T 7/11 |
| 2021/0004983 A1 | 1/2021 | Fischer et al. | |
| 2021/0086695 A1* | 3/2021 | Mahnken | G01S 7/51 |
| 2021/0272304 A1* | 9/2021 | Yang | G06V 10/25 |
| 2021/0405168 A1* | 12/2021 | Manglani | G01S 7/4972 |
| 2022/0044441 A1* | 2/2022 | Kalra | G06V 20/647 |
| 2022/0383112 A1* | 12/2022 | Tagliasacchi | G06N 3/048 |
| 2023/0052727 A1* | 2/2023 | Bargoti | G06T 7/0004 |
| 2023/0274517 A1* | 8/2023 | Navab | G06V 20/20 |
| | | | 345/418 |

\* cited by examiner

OBJECT POSE ESTIMATION

BACKGROUND

Deep neural networks can be trained to perform a variety of computing tasks. For example, neural networks can be trained to extract data from images. Data extracted from images by deep neural networks can be used by computing devices to operate systems including vehicles, robots, security, product manufacturing and product tracking. Images can be acquired by sensors included in a system and processed using deep neural networks to determine data regarding objects in an environment around a system. Operation of a system can rely upon acquiring accurate and timely data regarding objects in a system's environment.

DETAILED DESCRIPTION

Figure 1:
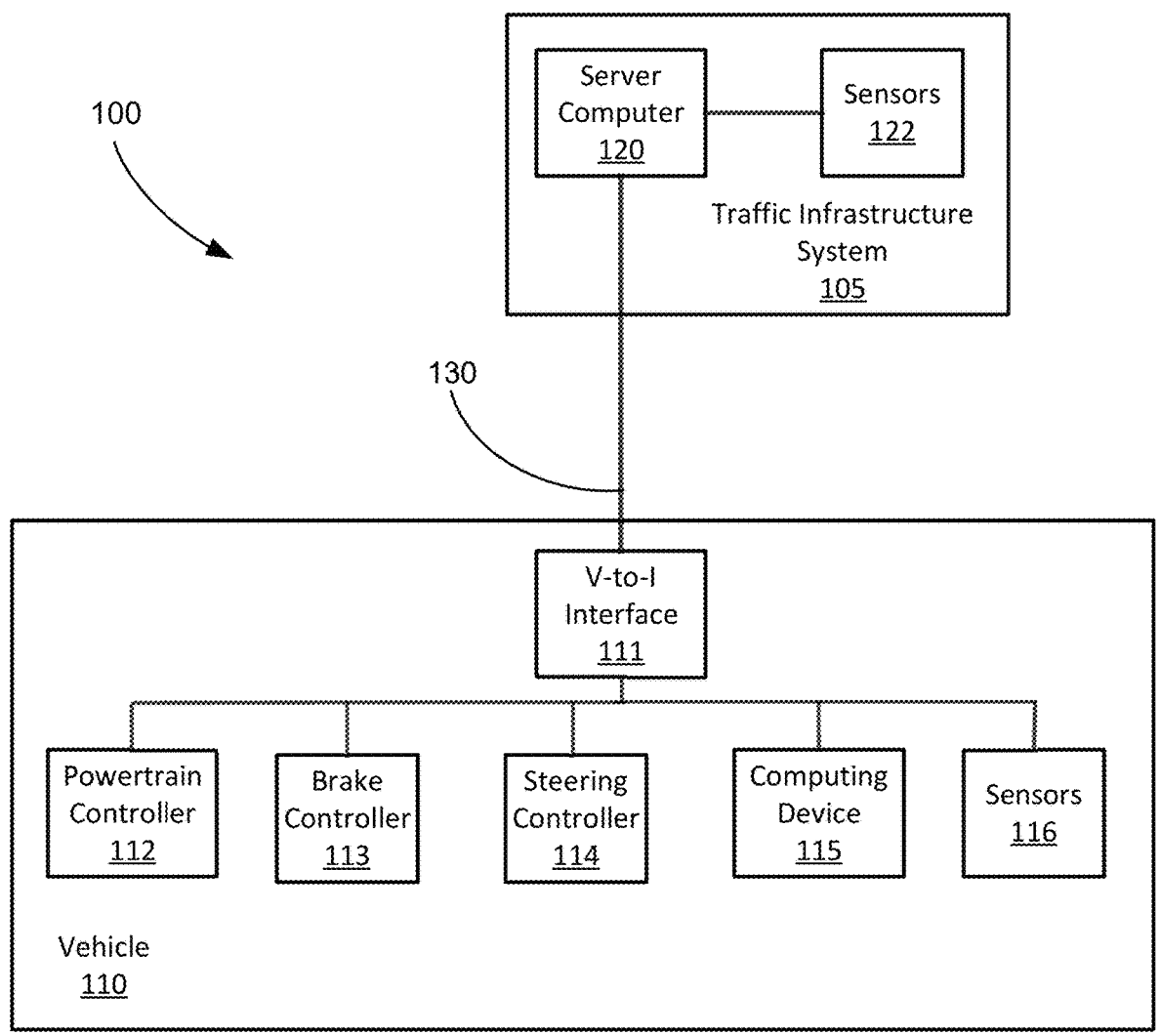
FIG. 1 is a block diagram of an example deep neural network system.

A deep neural network (DNN) can be trained to determine objects in image data acquired by sensors using a training dataset for systems including vehicle guidance, robot operation, security, manufacturing, and product tracking. Vehicle guidance can include operation of vehicles in autonomous or semi-autonomous modes. Robot guidance can include guiding a robot end effector, for example a gripper, to pick up a part and orient the part for assembly. Security systems include features where a computer acquires video data from a camera observing a secure area to provide access to authorized users and detect unauthorized entry. Security systems can also provide an authorized user access to a computing device or cell phone, for example. In a manufacturing system, a DNN in a computer can detect undesired operation of machinery in a manufacturing operation by determining a location of a person's hands at a particular time in relation to a machine operating cycle, for example. In a product tracking system, a deep neural network can detect a person removing an object from a shelf and putting it into a shopping cart and automatically charge the person for the object, for example. Other product tracking systems include package sorting for shipping, for example.

Vehicle guidance will be described herein as a non-limiting example of using a DNN to detect objects, for example vehicles. For example, a computing device in a traffic infrastructure can be programmed to acquire data regarding its environment detect objects in the data using a DNN. The data can include image data acquired from a still or video camera and range data acquired from a range sensor including a lidar sensor. A DNN can be trained to label and locate objects in the image data or range data. A computing device included in the traffic infrastructure system can use the identity and location of the detected objects to determine a vehicle path upon which to operate a vehicle in an autonomous or semi-autonomous mode. A vehicle can operate based on a vehicle path by determining commands to direct the vehicle's powertrain, braking, and steering components to operate the vehicle to travel along the path.

A large number of annotated visual or range images can be required to train a DNN to detect objects for vehicle guidance. Annotated visual or range images are images that include data regarding an identity and location of objects included in the visual or range images. Annotating visual or range images can require many hours of user input and many hours of computer time. For example, some training datasets include millions of images and can require millions of hours of user input and computer time. Techniques discussed herein improve training of DNNs to identify and locate objects by acquiring registered visual and range image data and using the range image data to provide ground truth for training the DNN. Registered visual and range data, referred to herein as RGB-D (red, green, blue, distance) image data, is image data in which corresponding pixels in the RGB, or visual image and the D or range image acquire data from the same point in the external environment. Two non-limiting commercial examples of RGB-D cameras are the Astra S 3D Camera by Orbbec and the Realsense D435 by Intel; other examples exist. The range image data provides ground truth data to train the DNN without requiring annotation of the visual or range image data, thereby reducing the time and computer resources required to produce a training dataset for training a DNN. Ground truth refers to data that can be used to determine the correctness of a result output from a DNN acquired from a source independent from the DNN.

A method is discloses herein including inputting a depth image of an object to a deep neural network to determine a first four degree-of-freedom pose of the object, inputting the first four degree-of-freedom pose and a three-dimensional model of the object to a silhouette rendering program to determine a first two-dimensional silhouette of the object and thresholding the depth image to determine a second two-dimensional silhouette of the object. A loss function is determined based on comparing the first two-dimensional silhouette of the object to the second two-dimensional silhouette of the object, deep neural network parameters are optimized based on the loss function and the deep neural network is output. The first four degree-of-freedom pose can be determined based on x, y, and z coordinates and an angle in an x, y plane. A translation matrix and a rotation matrix can be determined based on the first four degree-of-freedom pose. The translation matrix and the rotation matrix can permit differentiation with respect to the first four degree-of-freedom pose. The loss function can be determined by determining a distance between the first two-dimensional silhouette of the object to the second two-dimensional silhouette of the object. The distance can be one or more of an L1 distance, a chamfer distance, and a centroid distance.

Deep neural network parameters can be optimized based on the loss function by backpropagating the loss function through the deep neural network. The deep neural network can be a convolutional neural network that includes convolutional layers and fully connected layers. The three-dimensional model of the object can be determined based on one or more of computer aided design data or a lidar scan. A second four degree-of-freedom pose of the object can be based on a red, green, blue image and fiducial markers applied to the object. A second loss function can be determined based on comparing the second four degree-of-freedom pose of the object with the first four degree-of-freedom pose of the object. A vehicle path can be determined based determining one or more four degree-of-freedom poses for a vehicle. The vehicle can be operated on the vehicle path by controlling one or more of vehicle powertrain, vehicle brakes, and vehicle steering. The differentiation can determine in which direction to change the weights for a succeeding processing pass.

Further disclosed is a computer readable medium, storing program instructions for executing some or all of the above method steps. Further disclosed is a computer programmed for executing some or all of the above method steps, including a computer apparatus, programmed to input a depth image of an object to a deep neural network to determine a first four degree-of-freedom pose of the object, input the first four degree-of-freedom pose and a three-dimensional model of the object to a silhouette rendering program to determine a first two-dimensional silhouette of the object and threshold the depth image to determine a second two-dimensional silhouette of the object. A loss function is determined based on comparing the first two-dimensional silhouette of the object to the second two-dimensional silhouette of the object, deep neural network parameters are optimized based on the loss function and the deep neural network is output. The first four degree-of-freedom pose can be determined based on x, y, and z coordinates and an angle in an x, y plane. A translation matrix and a rotation matrix can be determined based on the first four degree-of-freedom pose. The translation matrix and the rotation matrix can permit differentiation with respect to the first four degree-of-freedom pose. The loss function can be determined by determining a distance between the first two-dimensional silhouette of the object to the second two-dimensional silhouette of the object. The distance can be one or more of an L1 distance, a chamfer distance, and a centroid distance.

The instructions can include further instructions to optimize deep neural network parameters based on the loss function by backpropagating the loss function through the deep neural network. The deep neural network can be a convolutional neural network that includes convolutional layers and fully connected layers. The three-dimensional model of the object can be determined based on one or more of computer aided design data or a lidar scan. A second four degree-of-freedom pose of the object can be based on a red, green, blue image and fiducial markers applied to the object. A second loss function can be determined based on comparing the second four degree-of-freedom pose of the object with the first four degree-of-freedom pose of the object. A vehicle path can be determined based determining one or more four degree-of-freedom poses for a vehicle. The vehicle can be operated on the vehicle path by controlling one or more of vehicle powertrain, vehicle brakes, and vehicle steering. The differentiation can determine in which direction to change the weights for a succeeding processing pass.

FIG. 1 is a diagram of an object detection system 100 that can include a traffic infrastructure system 105 that includes a server computer 120 and sensors 122. Object detection system includes a vehicle 110, operable in autonomous ("autonomous" by itself in this disclosure means "fully autonomous"), semi-autonomous, and occupant piloted (also referred to as non-autonomous) mode. One or more vehicle 110 computing devices 115 can receive data regarding the operation of the vehicle 110 from sensors 116. The computing device 115 may operate the vehicle 110 in an autonomous mode, a semi-autonomous mode, or a non-autonomous mode.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (e.g., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, e.g., via a vehicle communications bus as described further below, more than one computing devices, e.g., controllers or the like included in the vehicle 110 for monitoring and/or controlling various vehicle components, e.g., a powertrain controller 112, a brake controller 113, a steering controller 114, etc. The computing device 115 is generally arranged for communications on a vehicle communication network, e.g., including a bus in the vehicle 110 such as a controller area network (CAN) or the like; the vehicle 110 network can additionally or alternatively include wired or wireless communication mechanisms such as are known, e.g., Ethernet or other communication protocols.

Via the vehicle network, the computing device 115 may transmit messages to various devices in the vehicle and/or receive messages from the various devices, e.g., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements such as sensors 116 may provide data to the computing device 115 via the vehicle communication network.

In addition, the computing device 115 may be configured for communicating through a vehicle-to-infrastructure (V-to-I) interface 111 with a remote server computer 120, e.g., a cloud server, via a network 130, which, as described below, includes hardware, firmware, and software that permits computing device 115 to communicate with a remote server computer 120 via a network 130 such as wireless Internet (WI-FI®) or cellular networks. V-to-I interface 111 may accordingly include processors, memory, transceivers, etc., configured to utilize various wired and/or wireless networking technologies, e.g., cellular, BLUETOOTH® and wired and/or wireless packet networks. Computing device 115 may be configured for communicating with other vehicles 110 through V-to-I interface 111 using vehicle-to-vehicle (V-to-V) networks, e.g., according to Dedicated Short Range Communications (DSRC) and/or the like, e.g., formed on an ad hoc basis among nearby vehicles 110 or formed through infrastructure-based networks. The computing device 115 also includes nonvolatile memory such as is known. Computing device 115 can log data by storing the data in nonvolatile memory for later retrieval and transmittal via the vehicle communication network and a vehicle to infrastructure (V-to-I) interface 111 to a server computer 120 or user mobile device 160.

As already mentioned, generally included in instructions stored in the memory and executable by the processor of the computing device 115 is programming for operating one or more vehicle 110 components, e.g., braking, steering, propulsion, etc., without intervention of a human operator.

Using data received in the computing device 115, e.g., the sensor data from the sensors 116, the server computer 120, etc., the computing device 115 may make various determinations and/or control various vehicle 110 components and/or operations without a driver to operate the vehicle 110. For example, the computing device 115 may include programming to regulate vehicle 110 operational behaviors (i.e., physical manifestations of vehicle 110 operation) such as speed, acceleration, deceleration, steering, etc., as well as tactical behaviors (i.e., control of operational behaviors typically in a manner intended to achieve safe and efficient traversal of a route) such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

Controllers, as that term is used herein, include computing devices that typically are programmed to monitor and/or control a specific vehicle subsystem. Examples include a powertrain controller 112, a brake controller 113, and a steering controller 114. A controller may be an electronic control unit (ECU) such as is known, possibly including additional programming as described herein. The controllers may communicatively be connected to and receive instructions from the computing device 115 to actuate the subsystem according to the instructions. For example, the brake controller 113 may receive instructions from the computing device 115 to operate the brakes of the vehicle 110.

The one or more controllers 112, 113, 114 for the vehicle 110 may include known electronic control units (ECUs) or the like including, as non-limiting examples, one or more powertrain controllers 112, one or more brake controllers 113, and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computing device 115 and control actuators based on the instructions.

Sensors 116 may include a variety of devices known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide geographical coordinates of the vehicle 110. The distance(s) provided by the radar and/or other sensors 116 and/or the geographical coordinates provided by the GPS sensor may be used by the computing device 115 to operate the vehicle 110 autonomously or semi-autonomously, for example.

The vehicle 110 is generally a land-based vehicle 110 capable of autonomous and/or semi-autonomous operation and having three or more wheels, e.g., a passenger car, light truck, etc. The vehicle 110 includes one or more sensors 116, the V-to-I interface 111, the computing device 115 and one or more controllers 112, 113, 114. The sensors 116 may collect data related to the vehicle 110 and the environment in which the vehicle 110 is operating. By way of example, and not limitation, sensors 116 may include, e.g., altimeters, cameras, LIDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating, e.g., sensors 116 can detect phenomena such as weather conditions (precipitation, external ambient temperature, etc.), the grade of a road, the location of a road (e.g., using road edges, lane markings, etc.), or locations of target objects such as neighboring vehicles 110. The sensors 116 may further be used to collect data including dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components, and accurate and timely performance of components of the vehicle 110.

Vehicles can be equipped to operate in both autonomous and occupant piloted mode. By a semi- or fully-autonomous mode, we mean a mode of operation wherein a vehicle can be piloted partly or entirely by a computing device as part of a system having sensors and controllers. The vehicle can be occupied or unoccupied, but in either case the vehicle can be partly or completely piloted without assistance of an occupant. For purposes of this disclosure, an autonomous mode is defined as one in which each of vehicle propulsion (e.g., via a powertrain including an internal combustion engine and/or electric motor), braking, and steering are controlled by one or more vehicle computers; in a semi-autonomous mode the vehicle computer(s) control(s) one or more of vehicle propulsion, braking, and steering. In a non-autonomous mode, none of these are controlled by a computer.

Figure 2:
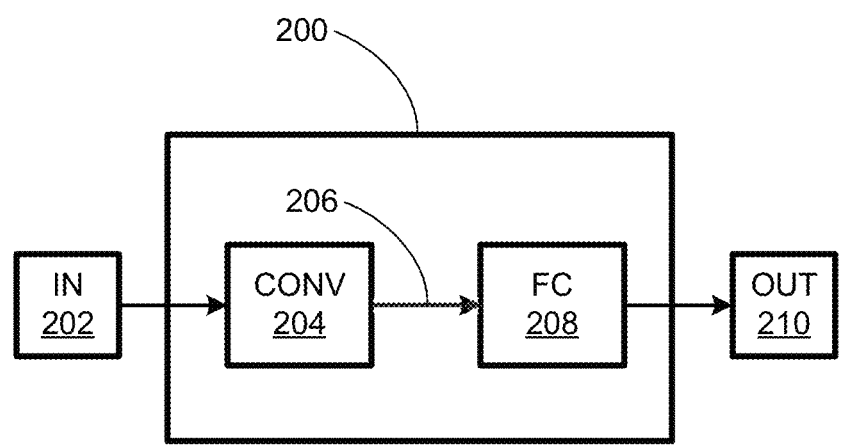
FIG. 2 is a diagram of an example deep neural network.

FIG. 2 is a diagram of a DNN 200. A DNN 200 can be a software program executing on a computing device 115 or a server computer 120 included in an object detection system 100. In this example DNN 200 is illustrated as a convolutional neural network (CNN). Techniques described herein can also apply to DNNs that are not implemented as CNNs. A DNN 200 implemented as a CNN typically inputs an input image (IN) 202 as input data. The input image 202 is processed by convolutional layers 204 to form latent variables 206 (i.e., variables passed between neurons in the DNN 200). Convolutional layers 204 include a plurality of layers that each convolve an input image 202 with convolution kernels that transform the input image 202 and process the transformed input image 202 using algorithms such as max pooling to reduce the resolution of the transformed input image 202 as it is processed by the convolutional layers 204. The latent variables 206 output by the convolutional layers 204 are passed to fully connected layers 208. Fully connected layers 208 include processing nodes. Fully connected layers 208 process latent variables 206 using linear and non-linear functions to determine an output prediction (OUT) 210. In examples discussed herein the output prediction 210 includes an object label and an object location. DNN 200 can be a software program executing on a server computer 120 in a traffic infrastructure system 105. The server computer 120 can input RGB images acquired by sensors 122 including RGB-D cameras included in traffic infrastructure system 105.

DNN 200 can be trained using a training dataset that includes images and corresponding ground truth. Training datasets for a DNN 200 can include thousands or millions of images and corresponding annotations or ground truth. Each image of the training dataset can be processed a plurality of times by the DNN 200. A prediction 210 output from the DNN 200 in response to an input image 202 is compared to the ground truth corresponding to the input image 202 to determine a loss function. The loss function is a mathematical function that determines how closely the prediction 210 output from DNN 200 matches the ground truth corresponding to the input image 202. The value determined by the loss function is input to the convolutional layers 204 and fully connected layers 208 of DNN 200 where it is backpropagated to determine weights for the layers that correspond to a minimum loss function. Backpropagation is a technique for training a DNN 200 where a loss function is input to the convolutional layers 204 and fully connected layers 208 furthest from the input and communicated from back-to-front and determining weights for each layer 204, 208 by selecting weights that minimize the loss function. Training a DNN 200 to determine a four degree-of-freedom (DoF) pose for a vehicle will be discussed in relation to FIG. 7, below.

A DNN can be trained to determine a four degree-of-freedom (DoF) pose for a vehicle. A three-dimensional pose for an object can be specified by determining the location and orientation of the object in six DoF. Six DoF include x, y, and z location coordinates determined with respect to x, y, and z orthogonal coordinate axes and roll, pitch, and yaw rotations about the x, y, and z axes, respectively. In examples discussed herein, the object, a vehicle, is assumed to be supported by a roadway or other surface such as a parking deck or lot that is a plane parallel to the x and y axes and the roll and pitch rotations are therefore assumed to be zero. A four DoF pose for a vehicle supported by a planar surface includes values for x, y, z, and yaw, where yaw is an angle in the plane defined by the x and y axes. Techniques discussed herein improve training of a DNN to determine a four DoF pose for a vehicle by annotating RGB image data using four DoF data acquired from a range image acquired by an RGB-D camera. Annotating RGB image data in this fashion can provide a large number (greater than thousands) of annotated RGB images for training a DNN without requiring manual annotation, thereby saving computer resources and time.

Figure 3:
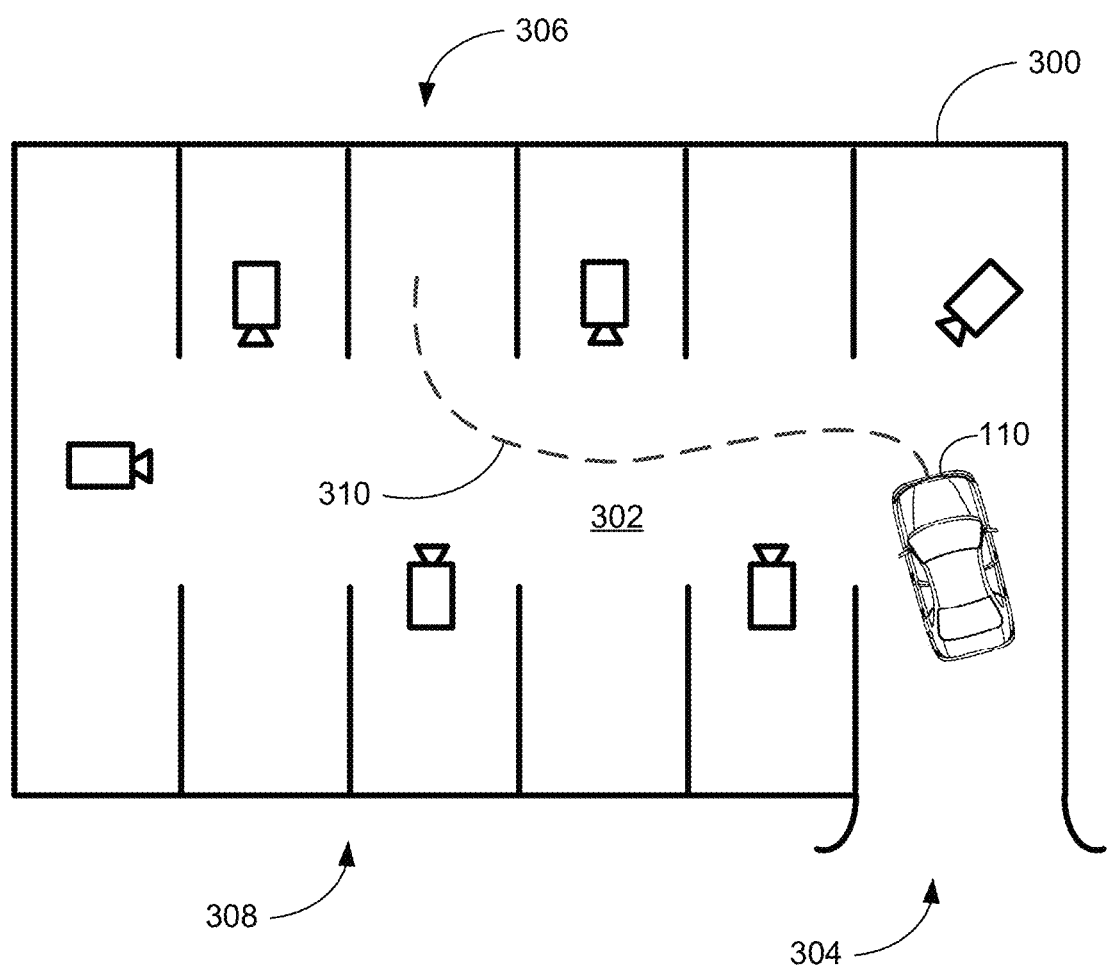
FIG. 3 is a diagram of an example parking deck.

FIG. 3 is a diagram of a floor 302 of a parking deck 300. A parking deck 300 is a structure that includes one or more floors 302 upon which vehicles 110 can be parked. A floor 302 of a parking deck 300, i.e., a surface on which vehicles 110 can travel, can be accessed by a vehicle 110 via an entrance 304, which can be accessed via a ramp or elevator that permits a vehicle 110 to access the floor 302 of the parking deck 300 when the floor 302 is not at ground level. A floor 302 of a parking deck 300 can include a plurality of parking locations 306, which are areas of the floor 302 designed to permit a vehicle 110 to be temporarily stored and retrieved. Parking deck 300 can include traffic infrastructure system 105 having a plurality of RGB-D cameras 308 attached to the parking deck 300. For example, the plurality of RGB-D cameras 308 can be attached to a ceiling of the parking deck 300 above the floor 302, which permits the RGB-D cameras 308 to view vehicles 110 operating on the floor 302 from above. The location of each RGB-D camera 308 with respect to the parking deck 300 can be determined and therefore determining the location of a vehicle 110 in an image acquired by an RGB-D camera 308 can determine the location of the vehicle 110 with respect to the parking deck 300. A server computer 120 can communicate with the RGB-D cameras 308 to determine a vehicle path 310 upon which the vehicle 110 can operate to travel to a parking location 306. The vehicle path 310 can be communicated to the vehicle 110 to permit the vehicle 110 to operate autonomously or semi-autonomously to park in a parking location 306 and later exit the parking location 306 and return to the entrance 304.

The plurality of RGB-D cameras 308 can include computing devices 115 that include a DNN software program that permits the RGB-D camera to determine a four DoF pose of a portion of a vehicle 110 in the field of view of the RGB-D camera. Based on one or more four DoF poses of a vehicle 110, the traffic infrastructure system 105 can determine a vehicle path 310. The vehicle path 310 can include a plurality of locations, which can be called "breadcrumbs" which, when joined, for example, by a polynomial function, can be used to operate a vehicle 110 to a location in the parking deck 300. For example, the vehicle path 310 can be used to direct a vehicle 110 from an entrance 304 of a floor 302 of a parking deck 300 to a parking location 306. While the vehicle 110 is operating in parking deck 300, RGB-D cameras 308 can be acquiring data regarding the location of vehicle 110 to determine whether the vehicle 110 is correctly following the vehicle path 310 determined by the traffic infrastructure system 105. In examples where vehicle 110 is deviating from the vehicle path 310, traffic infrastructure system 105 can transmit updated commands to a vehicle 110 to correct the operation of vehicle 110. In addition to parking decks 300, traffic infrastructure system 105 including RGB-D cameras 308 can be installed in manufacturing facilities, service facilities, or charging stations to direct the operation of vehicles 110 that include autonomous or semi-autonomous capabilities.

Figure 4:
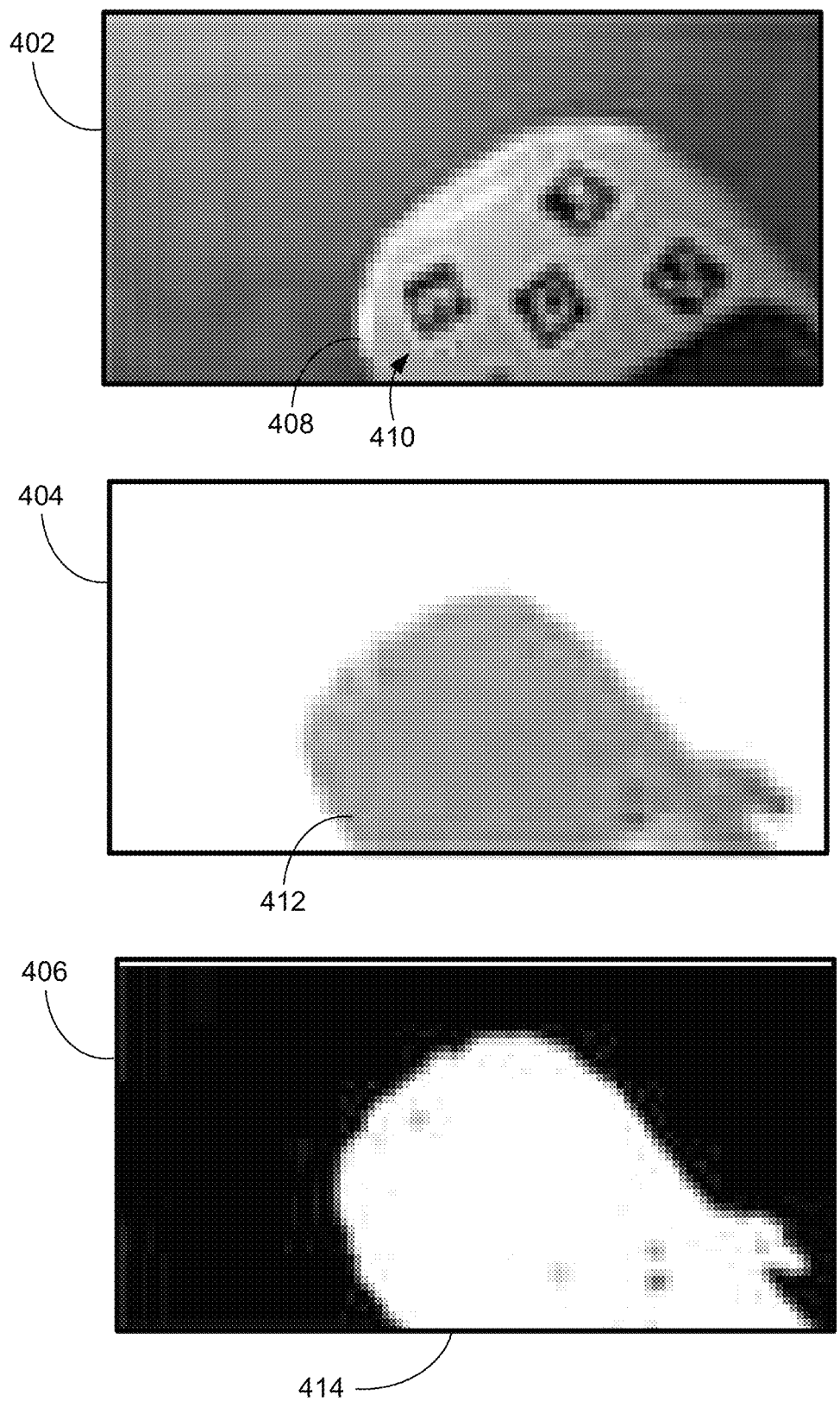
FIG. 4 is a diagram of three example images of a vehicle.

FIG. 4 is a diagram that includes an RGB image 402, a depth image 404, and a binary image 406 from an RGB-D camera 308. RGB image 402 includes a portion of a vehicle 408. RGB image 402 includes Aruco markers 410. Aruco markers 410 are fiducial patterns that can be processed using the ArUco software library developed by the Applications of Artificial Vision research group from the University of Cordoba, Cordoba, Spain, and available, as of the time of filing this document, at the uco.es website. Aruco markers 410 can be applied to a vehicle 408 and once the location of the Aruco markers 410 with respect to the vehicle 408 are established by physically measuring the Aruco markers 410, for example, the locations of the Aruco markers 410 in an RGB image determined using the ArUco software library can be used to determine the location of the vehicle 408 to which they are attached. Aruco markers 410 can be used as an optional technique for training a DNN 200 to locate vehicles 110 using RGB-D cameras to be discussed in relation to FIG. 7, below.

Depth image 404 of a vehicle 412 is acquired by a range sensor such as a lidar sensor of by the depth or range portion of an RGB-D camera 308. In examples discussed herein, the depth image 404 is registered with the RGB image 402. This means that for a given pixel x, y location in images 402, 404, the RGB image 402 will include the color of a location and the depth image 404 will include the distance or range to the same location. In examples where the RGB image 402 and depth image 404 are not registered, the offset in locations of each pixel between the RGB image 402 and the depth image 404 can be determined and the offset used to register the RGB image 402 and the depth image 404.

Binary image 406 of a vehicle 414 is the result of thresholding depth image 404. Thresholding is an image processing operation where a threshold value is selected and all pixels having value greater than or equal to the threshold value are set to "1" and all pixels having a value less that the threshold value are set to "0". Thresholding a depth image 404 to determine a binary image 406 permits determining differences in vehicle 412 location between a binary image 406 formed by thresholding a depth image 404 and a vehicle location in a binary image determined by rendering a depth image based on a three-dimensional (3D) model of a vehicle. Techniques discussed herein can train a DNN 200 by inputting a depth image 404 to the DNN to determine a four DoF pose for a vehicle 412 included in the depth image 404. The four DoF pose can be converted into a format for input to an image rendering software program by determining translation and rotation matrices that can be used to translate and rotate a 3D model from an input pose to a pose corresponding to the four DoF pose. Translation moves the 3D model in the x, y plane and rotation rotates the 3D model around the z axis at a selected center point 3D model. Converting the four DoF pose in this fashion preserves the differentiability of the four DoF pose. This is important when the four DoF pose is used to determine a loss function for training the DNN 200 as discussed in relation to FIG. 7, below.

The output and converted four DoF pose can be input to an image rendering software program, for example, UnReal Engine, available from Epic Games, Cary, NC 27518, along with a 3D model of the vehicle to generate a rendered depth image that includes a 3D rendering of a vehicle at the input four DoF pose. The 3D model of the vehicle can be based on computer aided design (CAD) data for the vehicle, discussed in relation to FIG. 6, below or can be generated by scanning the vehicle with a lidar scanner, discussed in relation to FIG. 5, below, to generate the 3D model data. The 3D model data is rotated and translated using the rotation and translation matrices and the 3D model is rendered by the rendering software to generate an image that includes a rendered version of the 3D model at the image coordinates corresponding to the four DoF pose. The rendered depth image can be thresholded to generate a rendered binary image.

The rendered binary image can be compared to the binary image 406 generated from the depth image 404 to determine a loss function for training the DNN 200. The comparison between the rendered binary image and the binary image 406 generated from the depth image 404 can be determined by determining differences in locations of the vehicles in the binary image 406 and the rendered binary image using L1 metrics, chamfer distance, centroid distance, or a combination of these measures. An L1 metric measures the vector distance between two binary images by summing the x and y distances between corresponding pixels of each image. This is also sometimes referred to as "Taxicab" distance. Chamfer distance weights the distance between corresponding pixels in the two binary images by weighting the distance, e.g., the greater the distance, the larger the weight. Centroid distance finds a center for the areas corresponding to the "1" pixels in the binary image and the rendered binary image and measures the distance between the centers. The differences between the binary image and the rendered binary image determines the loss function to be backpropagated through the layers of the DNN 200. Backpropagation is a technique for transmitting a loss function from the last layers of a DNN 200 to the first layers and selecting weights for each layer based on minimizing the loss function while processing the same input data a plurality of times while varying the weights.

Techniques discussed herein which determine the loss function from rendered four DoF poses and depth images 404 are differentiable. Differentiable means that the functions used to determine the loss functions have partial derivatives with respect to the weights used to determine the four DoF poses by the DNN 200. This means that, for a given loss function, a direction in which to change the weights for the next processing pass that will reduce the loss function can be determined. In this fashion, over a plurality of processing passes, weights can be determined that cause the loss functions to converge to a minimal value, thereby training the DNN 200.

Figure 5:
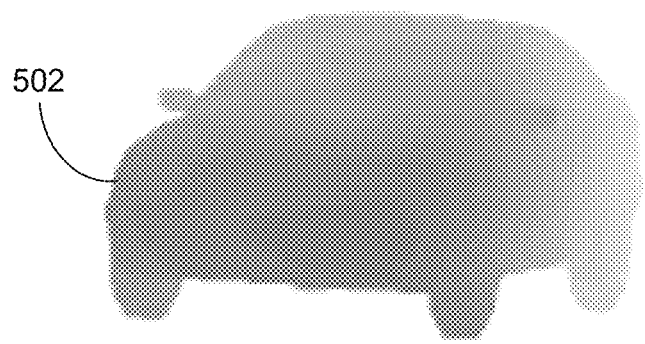
FIG. 5 is a diagram of an example three-dimensional model of a vehicle.

FIG. 5 is a diagram of a 3D model 500 of a vehicle 502 generated by scanning a real-world vehicle with a lidar scanner, for example. The 3D model 500 can be input to an image rendering software program and rotated, translated, and scaled according to a four DoF pose to produce a rendered, top-down depth image of the vehicle 502. The rendered, top-down depth image of the vehicle 502 can be thresholded to produce a rendered binary image of the vehicle 502 that can be compared to a binary image 406 based on a depth image 404 of the same type of vehicle acquired by an RGB-D camera 308 to form a loss function for training a DNN 200.

Figure 6:
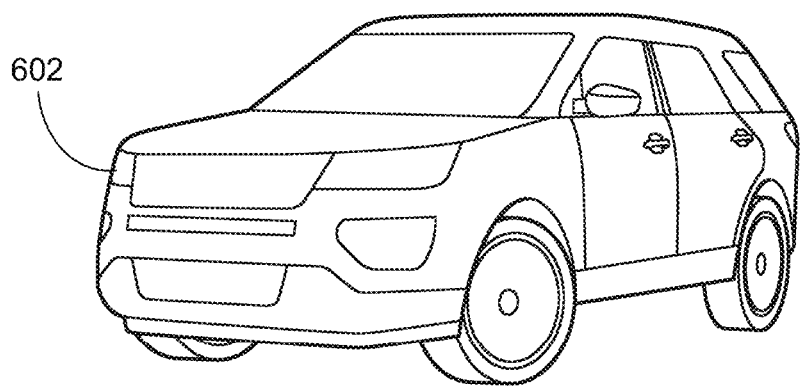
FIG. 6 is a diagram of an example computer aided design model of a vehicle.

FIG. 6 is a diagram of a CAD drawing 600 of a vehicle 602. A CAD drawing 600 is a rendering based on CAD data corresponding to a vehicle 602. The CAD data corresponding to a vehicle 602 includes the locations, orientations, and textures of the surfaces that make up a vehicle 602. The CAD data can be input to a rendering software program to produce a rendered top-down depth image that can be thresholded to generate a rendered binary image that can be compared to a binary image 406 based on a depth image 404 of the same type of vehicle acquired by an RGB-D camera 308 to form a loss function for training a DNN 200.

Figure 7:
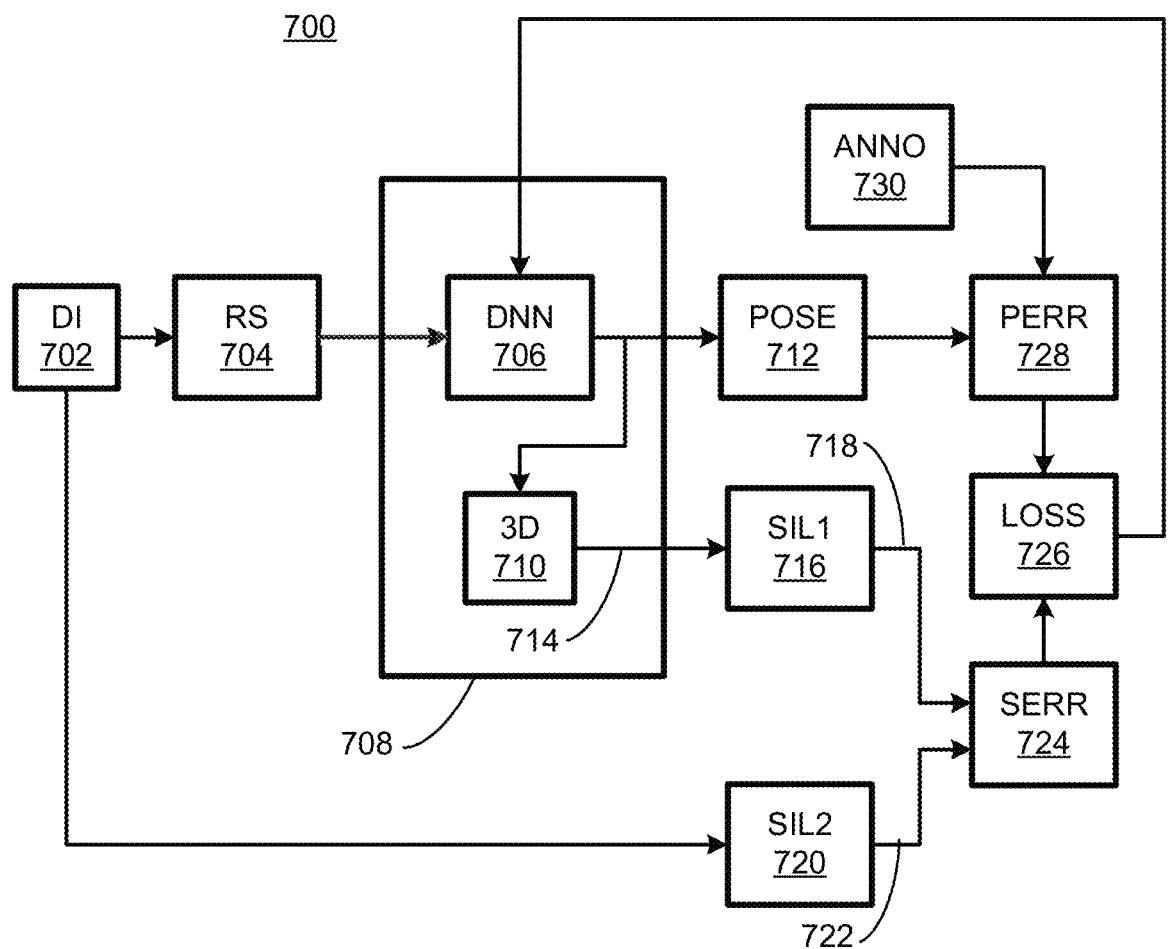
FIG. 7 is a diagram of an example self-supervised training system.

FIG. 7 is a diagram of a self-supervised training system 700 for training a DNN 706 to determine a four DoF pose based on depth image 702 input. A self-supervised training system 700 is a software program executing on a server computer 120 or computing device 115 included in a traffic infrastructure system 105. Self-supervised training system 700 inputs a depth image (DI) 702 acquired by a depth generating sensor, for example an RGB-D camera 308. The depth image 702 is first input to a resize program (RS) 704 that reduces a high-resolution depth image 702, for example, 1K×1K pixels (1000 pixels by 1000 pixels), to a lower resolution, for example, 256×256 pixels. The lower resolution depth image is input to a DNN (DNN) 7086, also referred to herein as SiriusNet 706. DNN or SiriusNet 706 is included in SiriusRenderNet 708 along with a 3D model renderer (3D) 710. DNN or SiriusNet 706 inputs a low-resolution depth image and outputs an estimated four DoF pose (POSE) 712 as ($\hat{x}$, $\hat{y}$, $\hat{z}$, yâw). The estimated four DoF pose 712 is input to the 3D model renderer 710 along with a 3D model of a vehicle, which can be the same make and model vehicle as was imaged by RGB-D camera 308 to form the depth image 702. The 3D model renderer 710 generates the rendered depth image 714 at the same high-resolution as the original input depth image 702.

The 3D model renderer 710 outputs a rendered depth image to a first silhouette processor (SIL1) 716 which thresholds the rendered depth image to form a first binary image 718. The input depth image 702 is passed to a second silhouette processor (SIL2) which thresholds the depth image 702 to form a second binary image 722. The two binary images 718, 722 are input to silhouette error (SERR) 724 to measure the distance between the two binary images 718, 722 to generate a binary silhouette error according to the equation:

$$\text{error}_{silhouette} = f_{dmap\_distance}(\text{silhouette}_{rendered}, \text{silhouette}_{depth}) \quad (1)$$

Where $f_{dmap\_distance}$ is based on one or more of L1 distance, chamfer distance, and centroid distance as discussed above in relation to FIG. 4. The silhouette error is passed to loss function (LOSS) 726 which generates a loss value to be returned to DNN or SiriusNet 706 where it is backpropagated to determine weights by minimizing the loss value.

In addition to training DNN or SiriusNet 706 using depth images 702 and rendered 3D models, a smaller subset of RGB images of vehicles 402 which include Aruco markers 410 can be acquired by the RGB-D camera 308 at the same time as the depth image 702. Because these images require calibrated Aruco markers 410, they typically require more computational expense and time to acquire than depth images 702. An advantage of using Aruco markers 410 is that they are applied to the vehicle as thin layer and do not interfere with the depth image 702. The RGB image including the Aruco markers 410 can be input to ArUco software library to determine a four DoF pose for the vehicle in the RGB image. The four DoF pose output by the ArUco software library can be input to the self-supervised training system 700 as an annotation (ANNO) 730, also referred to herein as ground truth. The annotation 730 is passed to pose error (POSE) 728, where the annotation 730 is compared to the four DoF pose 712 output by SiriusNet 706. Pose error 728 can be determined by the equation:

$$\text{error}_{supervised} = f_{pose\_distance}([x,y,z,yaw],[\hat{x},\hat{y},\hat{z},y\hat{a}w]) \quad (2)$$

where (x, y, z, yaw) is the four DoF pose determined by the ArUco software library, ($\hat{x}$, $\hat{y}$, $\hat{z}$, $\hat{y}aw$) is the four DoF pose determined by DNN or SiriusNet 706 and $f_{pose\_distance}$ is a mean square error metric. The pose error 728 can be combined with silhouette error 724 at loss function 726 to generate a combined loss value. Loss functions 726 generated based on pose error 728 can be used for initial training of DNN or SiriusNet 706 to assist in making DNN or SiriusNet 706 training converge more quickly, however, pose error 728 is not required to train DNN or SiriusNet 706.

Techniques discussed herein can improve self-supervised training of a DNN or SiriusNet 706 by reducing the requirement for annotated ground truth images such as provided by Aruco markings 410. This permits training using a large number, up to one million or more, of depth images acquired by depth sensors such as RGB-D cameras 308 without any further intervention to determine four DoF poses. The only requirement is that a 3D model of the vehicle being imaged is available to generate 3D models based on the estimated pose 712.

Figure 8:
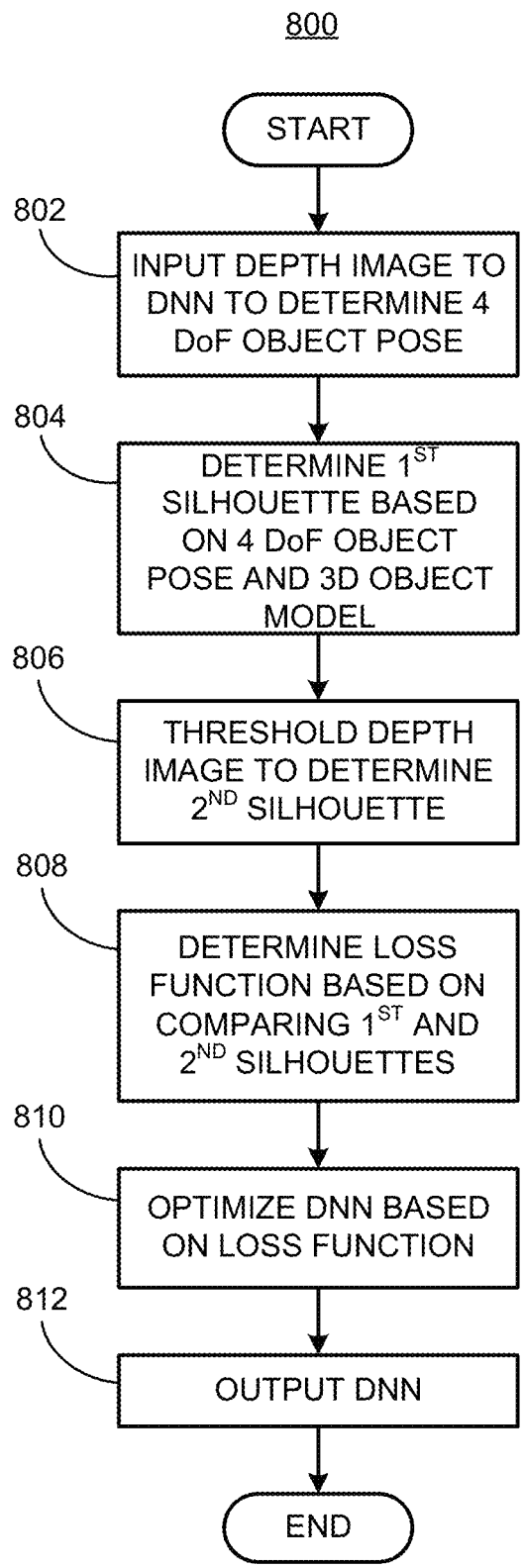
FIG. 8 is a flowchart diagram of an example process to train a deep neural network.

FIG. 8 is a diagram of a flowchart, described in relation to FIGS. 1-7, of a process for training a DNN 200 based on depth images 702. Process 800 can be implemented by a processor of a computing device 115 or server computer 120, taking as input information from sensors, and executing commands, and outputting object information, for example. Process 800 includes multiple blocks that can be executed in the illustrated order. Process 800 could alternatively or additionally include fewer blocks or can include the blocks executed in different orders.

Process 800 begins at block 802, where a depth image 702 is acquired with a depth sensor, which can include an RGB-D camera 308. The RGB-D camera 308 can be included in a traffic infrastructure system 105 included in a structure such as a parking deck 300, a manufacturing facility, a service facility, or an electric vehicle charging facility, for example. The depth image 702 is input to a DNN or SiriusNet 706 to determine a four DoF pose of an object included, at least in part, in the depth image 702. The object can be a vehicle 110, for example. The DNN 706 can be executing on a server computer 120 included in the traffic infrastructure system 105.

At block 804 process 800 determines a first silhouette image by inputting the four DoF pose of the object into a 3D rendering program along with a 3D model of the object to determine a rendered depth image of the object. For example, the 3D model can be CAD data regarding the particular make and model of vehicle included in the depth image 702 input to the DNN 706 at block 802. The rendered depth image can be thresholded based on a user determined threshold to determine the first silhouette image.

At block 806 process 800 thresholds the depth image 702 from block 802 based on a user determined threshold to determine as second silhouette image.

At block 808 process 800 compares the first silhouette image with the second silhouette image to determine a loss function as discussed in relation to FIG. 7.

At block 810 the DNN 706 is trained based on the loss function determined at block 808. The loss function can be backpropagated through the DNN 706 layers to determine weights that yield a minimum loss function based on processing the input depth image a plurality of times and determining a loss function for each processing pass. Because the steps used to determine the loss function are differentiable, the partial derivatives determined with respect to the weights can indicate in which direction to change the weights for a succeeding processing pass that will reduce the loss function and thereby permit the training function to converge, thereby optimizing the DNN 706.

At block 812 the DNN 706 can be output to a server computer 120 included in a traffic infrastructure system 105. The DNN 706 can input depth images 702 and output four DoF poses 712 for a vehicle 110 operating in a structure such as a parking deck 300. The server computer 120 can process the four DoF poses 712 to determine a plurality of locations, referred to herein as "breadcrumbs" that are included in a vehicle path 310. A vehicle path 310 can be determined based on the "breadcrumbs" by determining a polynomial function that passes through the "breadcrumbs", for example. The vehicle path 310 can be used by a computing device 115 in a vehicle 110 to operate the vehicle 110 by controlling one or more of vehicle powertrain, vehicle brakes, and vehicle steering to cause the vehicle 110 to travel along the vehicle path 310. Following block 812 process 800 ends.

Computing devices such as those discussed herein generally each includes commands executable by one or more computing devices such as those identified above, and for carrying out blocks or steps of processes described above. For example, process blocks discussed above may be embodied as computer-executable commands.

Computer-executable commands may be compiled or interpreted from computer programs created using a variety of programming languages and/or technologies, including, without limitation, and either alone or in combination, Java™, C, C++, Python, Julia, SCALA, Visual Basic, Java Script, Perl, HTML, etc. In general, a processor (e.g., a microprocessor) receives commands, e.g., from a memory, a computer-readable medium, etc., and executes these commands, thereby performing one or more processes, including one or more of the processes described herein. Such commands and other data may be stored in files and transmitted using a variety of computer-readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exactly described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps or blocks of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The invention claimed is:

1. A computer, comprising:
    a processor; and
    a memory, the memory including instructions executable by the processor to:
    input a depth image of an object to a deep neural network to determine a first four degree-of-freedom pose of the object;
    input the first four degree-of-freedom pose and a three-dimensional model of the object to a silhouette rendering program to determine a first two-dimensional silhouette of the object;
    threshold the depth image to determine a second two-dimensional silhouette of the object;
    determine a loss function based on comparing the first two-dimensional silhouette of the object which is based on the first four degree-of-freedom pose and the three-dimensional model of the object to the second two-dimensional silhouette of the object which is based on the depth image of the object;
    optimize deep neural network parameters based on the loss function; and
    output the deep neural network.

2. The computer of claim 1, wherein the first four degree-of-freedom pose is determined based on x, y, and z coordinates and an angle in an x, y plane.

3. The computer of claim 1, the instructions including further instructions to determine a translation matrix and a rotation matrix based on the first four degree-of-freedom pose.

4. The computer of claim 3, wherein the translation matrix and the rotation matrix permit differentiation with respect to the first four degree-of-freedom pose.

5. The computer of claim 1, the instructions including further instructions to determine the loss function by determining a distance between the first two-dimensional silhouette of the object to the second two-dimensional silhouette of the object.

6. The computer of claim 5, wherein the distance is one or more of an L1 distance, a chamfer distance, and a centroid distance.

7. The computer of claim 1, the instructions including further instructions to optimize deep neural network parameters based on the loss function by backpropagating the loss function through the deep neural network.

8. The computer of claim 1, wherein the deep neural network is a convolutional neural network that includes convolutional layers and fully connected layers.

9. The computer of claim 1, wherein the three-dimensional model of the object is determined based on one or more of computer aided design data or a lidar scan.

10. The computer of claim 1, the instructions including further instructions to determine a second four degree-of-freedom pose of the object based on a red, green, blue image and fiducial markers applied to the object.

11. The computer of claim 10, the instructions including further instructions to determine a second loss function based on comparing the second four degree-of-freedom pose of the object with the first four degree-of-freedom pose of the object.

12. The computer of claim 1, the instructions including further instructions to determine a vehicle path based determining on one or more four degree-of-freedom poses for a vehicle.

13. The computer of claim 12, the instructions including further instructions to operate the vehicle on the vehicle path by controlling one or more of vehicle powertrain, vehicle brakes, and vehicle steering.

14. A method, comprising:
    inputting a depth image of an object to a deep neural network to determine a first four degree-of-freedom pose of the object;
    inputting the first four degree-of-freedom pose and a three-dimensional model of the object to a silhouette rendering program to determine a first two-dimensional silhouette of the object;
    thresholding the depth image to determine a second two-dimensional silhouette of the object;
    determining a loss function based on comparing the first two-dimensional silhouette of the object which is based on the first four degree-of-freedom pose and the three-dimensional model of the object to the second two-dimensional silhouette of the object which is based on the depth image of the object;
    optimizing deep neural network parameters based on the loss function; and
    outputting the deep neural network.

15. The method of claim 14, wherein the first four degree-of-freedom pose is determined based on x, y, and z coordinates and an angle in an x, y plane.

16. The method of claim 14, further comprising determining a translation matrix and a rotation matrix based on the first four degree-of-freedom pose.

17. The method of claim 16, wherein the translation matrix and the rotation matrix permit differentiation with respect to the first four degree-of-freedom pose.

18. The method of claim 14, further comprising determining the loss function by determining a distance between the first two-dimensional silhouette of the object to the second two-dimensional silhouette of the object.

19. The method of claim 18, wherein the distance is one or more of an L1 distance, a chamfer distance, and a centroid distance.

20. The method of claim 14, further comprising optimizing deep neural network parameters based on the loss function by backpropagating the loss function through the deep neural network.

\* \* \* \* \*